Aug. 14, 1945.  W. F. HECKMAN  2,382,566
WINDOW GLASS
Filed Dec. 10, 1941
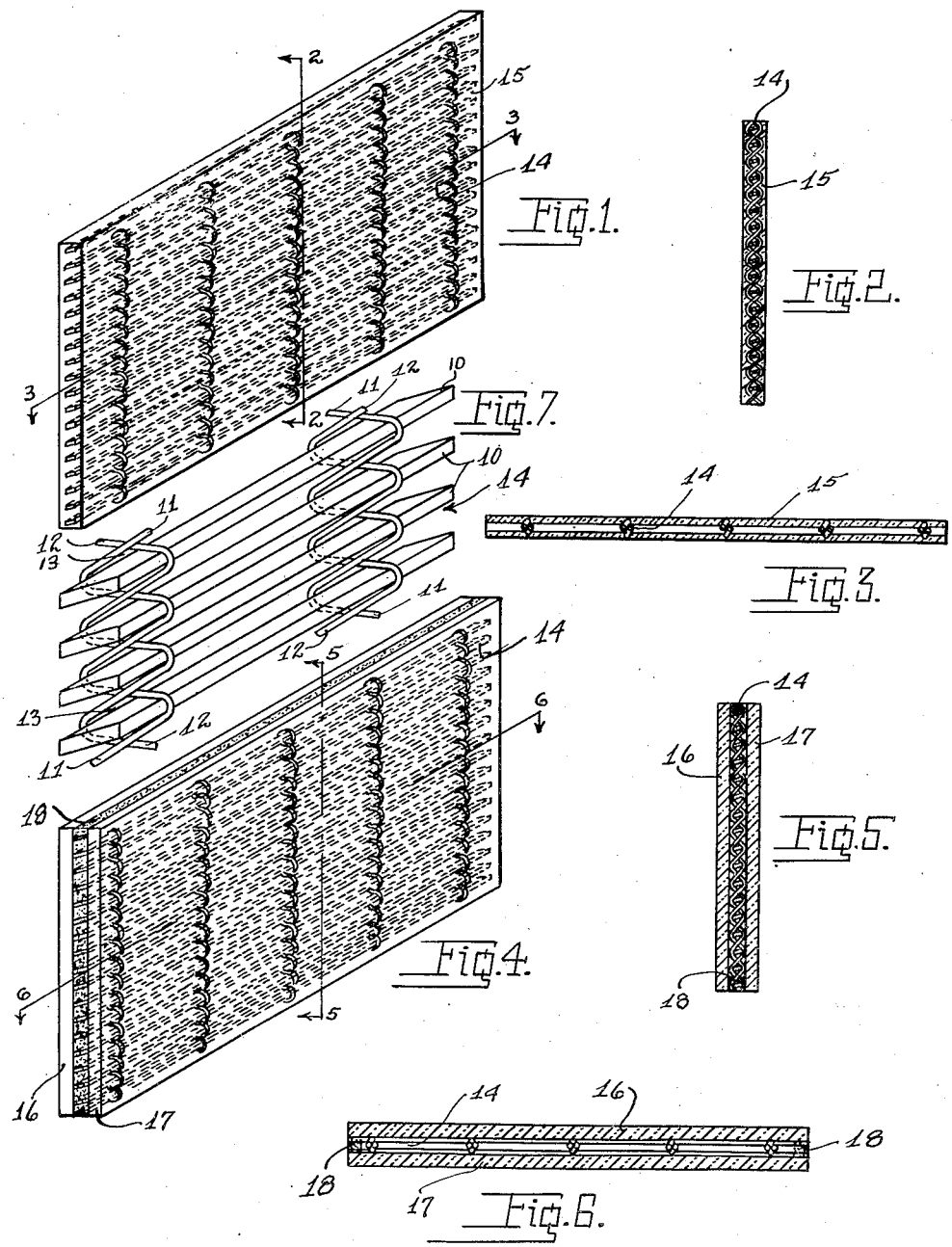
INVENTOR.
WILLIAM F. HECKMAN
BY
Joseph A. Rave
Attorney Patented Aug. 14, 1945

2,382,566

UNITED STATES PATENT OFFICE 2,382,566

WINDOW GLASS

William F. Heckman, Newport, Ky.

Application December 10, 1941, Serial No. 422,409

11 Claims. (Cl. 88—60)

This invention relates to improvements in window glass, that is a composite article formed of glass and metal which will find its chief use as a glass for use in building windows, train windows, bus windows, airplane windows and similar places for deflecting direct light rays.

Ordinary glass, which is transparent, permits the passage of light rays and to a very large extent the transmission of heat rays such, for example, as accompanies direct sun rays. "Opaque" glass, while translucent, is not transparent and materially interferes with the transmission of sun light rays but not the accompanying heat rays and has the disadvantage of preventing visibility therethrough. The composite article of this invention, hereinafter to be referred to as glass, has the property of transparency without the disadvantage of ordinary glass in its transmission of heat rays.

It is, therefore, an object of this invention to provide a window glass which is transparent to a high degree but prevents the passage of glaring over head light rays such as sun light.

Another object of this invention is the provision of a window glass which will act as a sun shade in preventing the passage therethrough of sun light rays which are glaring.

Another object of this invention is the provision of a window glass which will permit the passage of light and has the property of visibility but will prevent the passage therethrough of sun heat rays when the sun is over head and a reasonable distance above the horizon.

Other objects and advantages of the present invention should be readily apparent by reference to the following specification considered in conjunction with the accompanying drawing forming a part thereof and it is to be understood that any modification may be made in the exact structural details there shown and described, within the scope of the appended claims, without departing from or exceeding the spirit of the invention.

In the drawing:

Fig. 1 is a perspective view of a rectangular piece of glass including the improvements of this invention.

Fig. 2 is a vertical sectional view through the glass taken on line 2—2 on Fig. 1.

Fig. 3 is a horizontal sectional view through the glass taken on line 3—3 on Fig. 1.

Fig. 4 is a perspective view of a rectangular piece of glass, similar to Fig. 1, but showing a modification in its construction.

Fig. 5 is a vertical sectional view through Fig. 4 taken on line 5—5 thereon.

Fig. 6 is a horizontal sectional view through the glass taken on line 6—6 on Fig. 4.

Fig. 7 is a perspective view, on an enlarged scale, of the screening element forming a part of the composite glass which imparts the desired properties thereto.

Throughout the several views of the drawing, similar reference characters are employed to denote the same or similar parts.

There has been produced a metallic screen material for use in openings of buildings, and similar places which effectively prevents glaring sun rays and glaring over head light rays from entering through these openings. A portion of such a screen, on an enlarged scale with respect to the rest of the drawing, is illustrated in Fig. 7. This screen may be roughly likened to Venetian blinds except that the horizontal strips or louvres are of a fixed angle to the vertical plane of the window, whereas the usual Venetian blind has these louvres adjustable. Specifically referring to Fig. 7 of the drawing, there is illustrated a plurality of horizontal blades, strips or louvres 10, each of which is tilted to an angle with respect to the vertical plane of the window and to the horizontal plane normal to the vertical plane through the window. This angle of inclination may be varied, by experiment, to the most effective point, depending entirely upon what position the sun, or other light source, has with respect to the window or other opening to be shaded and to the amount of clear or transparent space desired. The louvres 10 are quite thin, depending upon the strength to be desired in the screen and may be in the nature of the thinness of the wire normally used in insect screens. These louvres are spaced apart a distance again comparable with the distance of the horizontal and vertical round wires of the insect screen. The louvres 10 are maintained in their spaced apart relation and in definite inclination by a pair of wires 11 and 12 which are laced around successive louvres 10 and may be twisted beneath each pair of louvres thereby providing, between lacings, a pocket 13 for the louvres.

As was mentioned above, this screening is available on the market and is not new with the applicant; and as a practical example, the louvres 10 are arranged at an angle of 17° to the horizontal which prevents sun rays from passing through the window after the sun has risen to an angle of approximately 40° to the horizontal. With this construction the sun rays are effectively kept from entering through the screened openings when the sun is passing through its arc for directing its hottest rays toward the earth.

This invention pertains to the incorporation of the screen just described and indicated in general by the reference numeral 14, with glass, such as is usually employed in windows. As illustrated in Figs. 1, 2 and 3 the glass 15 is molded, poured or cast around the screen element 14 in a manner much the same as the heretofore known, and so called "fireproof" glass, has been formed. By this construction there is provided window glass that is as transparent as would be obtained if an ordinary glass window were employed with an outside or inside window screen.

With this type of glass an ideal medium is provided for glazing buildings, which have had their walls and ceilings insulated against the transmission of heat, for thereby keeping the solar heat rays from passing through the windows, as is the said heat rays prevented from passing through the building walls and roof by the insulation therein. The glass of this invention is an excellent medium for glazing the present day air-conditioned interiors of buildings, railway cars, aircraft and buses in that the solar heat is prevented from passing through the windows without materially lowering the visibility of said windows beyond that of a screened window, and thereby materially reducing the load on air-conditioning plants and units.

In the modification illustrated in Figs. 4, 5 and 6 use is made of the screen element 14 which is placed between two panes or plates of glass 16 and 17 with the said glass panes or plates secured to one another around their edges by a suitable connecting and sealing compound 18. It is contemplated in this form of construction that the space between the glass sections 16 and 17 may be allowed to be a "dead air" space and thereby acting as a heat insulation element by radiation from the interior to the exterior, or the air may be exhausted from this space thereby providing a vacuum between the glass sections 16 and 17 which acts in a manner similar to the "dead air" space.

It is believed that the action of the window glass whether of the form shown in Fig. 1 or Fig. 4 is readily understood since the sun and other glaring light rays together with the heat rays that are carried thereby upon striking the face of the inclined slats or vanes 10 and deflected upwardly are diffused so as to provide what is usually termed as "soft light." It is further contemplated that the surface of the louvres 10 will be highly polished and reflective as will the binding and spacing wires 11 and 12 which can readily be accomplished by either forming the slats or louvres from bright materials or by nickel plating these parts or chromium plating them to obtain the increased reflective properties of these metals. Since the outer surfaces may be formed perfectly smooth they can be expeditiously cleaned and maintained.

It will be appreciated that with this form of glass it has imparted thereto shatter-proof qualities, or it may be formed as is the present day shatter-proof glass, that is, with the usual transparent connecting medium between two sheets or panes of glass. Furthermore in the form of the invention, illustrated in Figs. 4, 5 and 6, the panes 16 and 17 may be of the shatter-proof form.

It is believed from the foregoing that it is now evident that there has been provided a window glass having the necessary properties for preventing the transmission of solar heat and glaring light rays while at the same time not interfering appreciably with the visualness and the transparency of the glass.

What is claimed is:

1. In a closure for window openings and the like, a louvre screen substantially of the thinness of the wire used in insect screens comprising thin, metallic louvres of greater width than thickness extending horizontally in the screen, and spaced apart a distance comparable with the spacing of the wires in insect screens, and wire tie members extending transversely to the louvres and capable of supporting the louvres in parallel spaced position, the said louvres being tilted in said screen at an angle other than a right angle to the plane of said screen, and being so proportioned in width, spacing and angularity that normal vision through the screen in a direction substantially perpendicular to its plane is preserved, while light striking said screen from one direction at an angle to said perpendicular to the plane of the screen is cut off by the said louvres, in combination with means providing on each side of said screening a transparent protective glassy surface, substantially co-extensive with said screen, said last mentioned means acting to maintain said louvre screen in its own plane without the necessity of separate framing, and to preserve it from mechanical damage and the collection of dust and dirt.

2. The structure claimed in claim 1, wherein said screen is bodily imbedded in a pane of transparent substance.

3. The structure claimed in claim 1, wherein said screen is bodily imbedded in a single sheet of transparent glass having smooth and substantially parallel surfaces.

4. The structure claimed in claim 1, wherein said screen is bodily imbedded in a single sheet of transparent glass having smooth and substantially parallel surfaces, and in which the surfaces of said louvres are metallic and have a high reflectivity.

5. The structure claimed in claim 1, wherein said means providing the glassy surface comprises two panes of transparent substance between which said screen is confined, said screen serving to space said panes.

6. The structure claimed in claim 1, wherein said means providing the glassy surface comprises two panes of transparent substance between which said screen is confined, said screen serving to space said panes, and means adjacent the edges of said panes for fastening said panes together and for confining said screen therebetween, whereby said panes and said screen form a unitary closure structure.

7. The structure claimed in claim 1, wherein said means providing the glassy surface comprises two panes of transparent substance between which said screen is confined, said screen serving to space said panes, and means adjacent the edges of said panes for fastening said panes together and for confining said screening therebetween, whereby said panes and said screen form a unitary closure structure, said fastening means comprising a cementitious substance in which said screen is imbedded.

8. The structure claimed in claim 1, wherein said means providing the glassy surface comprises two panes of transparent substance between which said screen is confined, said screen serving to space said panes, and means adjacent the edges of said panes for fastening said panes together and for confining said screen therebetween, whereby said panes and said screen form a unitary closure structure, said fastening means comprising means forming a substantially gas-tight seal about the edges of said panes.

9. The structure claimed in claim 1, wherein said means providing the glassy surface comprises two panes of transparent substance between which said screen is confined, said screen serving to space said panes, and means adjacent the edges of said panes for fastening said panes together and for confining said screen therebetween, whereby said panes and said screen form a unitary closure structure, said fastening means comprising means forming a gas-tight seal about the edges of said panes, the space between said panes being exhausted.

10. The structure claimed in claim 1, wherein said means providing the glassy surface comprises interspaced panes of transparent glass between which said screen is confined, said screen serving to space said panes, and fastening means about the edges of said panes whereby to bind the structure into an integral unit, the surfaces of said louvres being metallic in nature and having a bright luster.

11. In an air conditioned vehicle, a window opening having a light pervious closure which comprises a louvre screen substantially of the thinness of the wire used in insect screens having thin, metallic louvres of greater width than thickness extending in a horizontal direction in the screen, and spaced apart a distance comparable with the spacing of wires in insect screens, the said louvres being tilted in said screen at an angle other than a right angle to the plane of the screen, and being so proportioned in width, spacing and angularity that normal vision through the screen in a direction substantially perpendicular to its plane is preserved, while light striking said screen downwardly at an angle to said perpendicular is cut off by said louvres, in combination with means providing on each side of said screen a transparent protective glassy surface, substantially coextensive with said screening and impervious to the passage of air, said screening and said last mentioned means providing a transparent combination, and said last mentioned means acting to maintain said louvre screen in its own plane without the necessity of separate framing, and to preserve it from mechanical damage and the collection of dust and dirt.

WILLIAM F. HECKMAN.